US009607627B2

(12) United States Patent
Liang et al.

(10) Patent No.: US 9,607,627 B2
(45) Date of Patent: Mar. 28, 2017

(54) SOUND ENHANCEMENT THROUGH DEVERBERATION

(71) Applicant: Adobe Systems Incorporated, San Jose, CA (US)

(72) Inventors: Dawen Liang, New York, NY (US); Matthew Douglas Hoffman, San Francisco, CA (US); Gautham J. Mysore, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 132 days.

(21) Appl. No.: 14/614,793

(22) Filed: Feb. 5, 2015

(65) Prior Publication Data

US 2016/0232914 A1 Aug. 11, 2016

(51) Int. Cl.

| | |
|---|---|
| ***H04B 3/20*** | (2006.01) |
| ***G10L 21/02*** | (2013.01) |
| ***G10L 21/0208*** | (2013.01) |
| *G10L 21/0216* | (2013.01) |
| *G10L 21/0232* | (2013.01) |

(52) U.S. Cl.

CPC ...... *G10L 21/0208* (2013.01); *G10L 21/0216* (2013.01); *G10L 21/0232* (2013.01); *G10L 2021/02082* (2013.01)

(58) Field of Classification Search

CPC ........... G10L 2021/02082; G10L 21/02; G10L 21/034; G10L 21/0208; G10L 21/0224; G10L 21/0216; G10L 21/0232; H04R 3/005; H04R 3/02; H04R 3/04; H04R 1/2888; H04R 29/004; H04B 3/20; G10H 2210/281; G10K 11/1784; G10K 11/1788; H04S 7/305

See application file for complete search history.

(56) References Cited

U.S. PATENT DOCUMENTS 6,163,608 A * 12/2000 Romesburg ........... H04M 9/082 379/406.01
6,532,289 B1 * 3/2003 Magid ...................... H04B 3/23 379/406.01

(Continued)

OTHER PUBLICATIONS

Attias,"Speech Denoising and Dereverberation Using Probabilistic Models", Advances in neural information processing systems, 2001, 2001, 7 pages.

(Continued)

*Primary Examiner* — Thang Tran
(74) *Attorney, Agent, or Firm* — Wolfe-SBMC

(57) ABSTRACT

Sound enhancement techniques through dereverberation are described. In one or more implementations, a method is described of enhancing sound data through removal of reverberation from the sound data by one or more computing devices. The method includes obtaining a model that describes primary sound data that is to be utilized as a prior that assumes no prior knowledge about specifics of the sound data from which the reverberation is to be removed. A reverberation kernel is computed having parameters that, when applied to the model that describes the primary sound data, corresponds to the sound data from which the reverberation is to be removed. The reverberation is removed from the sound data using the reverberation kernel.

20 Claims, 9 Drawing Sheets

(56) References Cited

U.S. PATENT DOCUMENTS

| | | | | |
|---|---|---|---|---|
| 7,440,891 | B1 * | 10/2008 | Shozakai | G10L 15/20 704/226 |
| 7,747,002 | B1 * | 6/2010 | Thi | H04B 3/23 379/406.08 |
| 2004/0240664 | A1 * | 12/2004 | Freed | H04M 9/082 379/406.01 |
| 2006/0034447 | A1 * | 2/2006 | Alves | H04M 9/082 379/406.01 |
| 2011/0019831 | A1 * | 1/2011 | Liu | H04M 9/082 381/66 |
| 2015/0016622 | A1 * | 1/2015 | Togami | H04R 3/02 381/66 |
| 2015/0063580 | A1 * | 3/2015 | Huang | G10L 21/0208 381/66 |
| 2015/0172468 | A1 * | 6/2015 | Liu | H04B 3/20 455/570 |
| 2016/0066087 | A1 * | 3/2016 | Solbach | H04R 3/002 381/71.1 |
| 2016/0150337 | A1 * | 5/2016 | Nandy | H04R 29/004 381/66 |

OTHER PUBLICATIONS

Bansal,"BAndwidth Expansion of Narrowband Speech Using Non-Negative Matrix Factorization", in 9th European Conference on Speech Communication (Eurospeech), 2005., Sep. 2005, 6 pages.
Boulanger-Lewandowski,"Exploiting Long-Term Temporal Dependencies in NMF Using Recurrent Neural Networks With Application to Source Seperation", In Acoustics, Speech and Signal Processing, IEEE International Conference on, 2014, 2014, 5 pages.
Cemgil,"Bayesian Inference for Nonnegative Matrix Factorisation Models", Computational Intelligence and Neuroscience, 2009., 2009, 18 pages.
Duan,"Speech Enhancement by Online Non-negative Spectrogram Decomposition in Non-stationary Noise Environments", in INTERSPEECH, 2012., 2012, 4 pages.
Falk,"A Non-Intrusive Quality and Intelligibility Measure of Reverberant and Dereverberated Speech", Sep. 2010, pp. 1766-1774.
Fevotte,"Nonnegative Matrix Factorization with the Itakura-Saito Divergence: With Application to Music Analysis", Neural Computation 21, 793-830 (2009), Jul. 3, 2008, pp. 793-830.
Habets,"Single- and Multi-Microphone Speech Dereverberation using Spectral Enhancement", Ph.D. thesis, Technische Universiteit Eindhoven, 2007., 2007, 257 pages.
Hoffman,"Bayesian Nonparametric Matrix Factorization for Recorded Music", In Proceedings of the 27th Annual International Conference on Machine Learning, pages, 2010., 2010, 8 pages.
Hu,"Evaluation of Objective Quality Measures for Speech Enhancement", Audio, Speech, and Language Processing, IEEE Transactions on, vol. 16, No. 1, 2008, pp. 229-238.
Jordan,"An introduction to variational methods for graphical models", Machine learning, 37(2):183-233, 1999., 1999, pp. 183-223.
Lee,"Algorithms for Non-negative Matrix Factorization", in NIPS 13, 2001, 2001, 7 pages.
Liang,"A Generative Product-of-FiltersModel of Audio", in International Conference on Learning Representations, 2014., 2014, 12 pages.
Liang,"Speech Decoloration Based on the Product-of-Filters Model", in Acoustics, Speech and Signal Processing, IEEE International Conference on, 2014, 2014, 5 pages.
Lincoln,"The multichannel Wall Street Journal audio-visual corpus (MC-WSJ-AV): Specification and initial experiments", in Automatic Speech Recognition and Understanding, 2005 IEEE Workshop on., 2005, 6 pages.
Mysore,"Non-negative Hidden Markov Modeling of Audio with Application to Source Separation", in Latent Variable Analysis and Signal Separation, 2010., 2010, 8 pages.
Robinson,"WSJCAM0: A british english speech corpus for large vocabulary continuous speech recognition", In Proc. ICASSP 95. 1995, 1995, 4 pages.
Smaragdis,"Non-Negative Matrix Factorization for Polyphonic Music Transcription", IEEE Workshop on Applications of Signal Processing to Audio and Acoustics, Oct. 19, 2003, pp. 177-180.
Sun,"Universal Speech Models for Speaker Independent Single Channel Source Separation", in ICASSP, 2013., 2013, 8 pages.
Cauchi, et al., "Joint Dereverberation and Noise Reduction Using Beamforming and a Single-Channel Speech Enhancement Scheme", In the Proceedings of Reverb Challenge, 2014., 2014, 8 pages.
Gonzalez, et al., "Single Channel Speech Enhancement Based on Zero Phase Transformation in Reverberated Environments", In the Proceedings of Reverb Challenge, 2014., 2014, 7 pages.
Hoffman, et al., "Stochastic Variational Inference", The Journal of Machine Learning Research, vol. 14, No. 1, 2013, 45 pages.
Kingsbury, et al., "Robust speech recognition using the modulation spectrogram", Speech Communication 25 (1998) 117±132, 1998, 16 pages.
Lebart, et al., "A New Method Based on Spectral Subtraction for Speech Dereverberation", Acta Acustica united with Acustica, 2001, 8 pages.
Nakatani, et al., "Harmonicity-Based Blind Dereverberation for Single-Channel Speech Signals", IEEE Transactions on Audio, Speech, and Language Processing, 2007, 14 pages.
Wisdom, et al., "Enhancement of Reverberant and Noisy Speech by Extending Its Coherence", In the Proceedings of REVERB Challenge, 2014., 2014, 8 pages.
Xiao, et al., "The NTU-ADSC Systems for Reverberation Challenge 2014", In the Proceedings of REVERB Challenge, 2014., 2014, 8 pages.

* cited by examiner

SOUND ENHANCEMENT THROUGH DEVERBERATION

BACKGROUND

Sounds may persist after production in a process known as reverberation, which is caused by reflection of the sound in an environment. For example, speech may be generated by users within a room, outdoors, and so on. After the users speak, the speech is reflected off of objects in the user's environment, and therefore may arrive at different points in time to a sound capture device, such as a microphone. Accordingly, the reflections may cause the speech to persist even after it has stopped being spoken, which is noticeable to a user as noise.

Speech enhancement techniques have been developed to remove this reverberation, in a process known as dereverberation. Conventional dereverberation techniques, however, had difficulty in recognizing dereverberation as well as had a reliance on known priors describing the sound, the environment in which the sound is captured, and so on. Consequently, these conventional dereverberation techniques often failed as this prior knowledge is not often practically available.

SUMMARY

Sound enhancement techniques through dereverberation are described. In one or more implementations, a method is described of enhancing sound data through removal of reverberation from the sound data by one or more computing devices. The method includes obtaining a model that describes primary sound data that is to be utilized as a prior that assumes no prior knowledge about specifics of the sound data from which the reverberation is to be removed. A reverberation kernel is computed having parameters that, when applied to the model that describes the primary sound data, corresponds to the sound data from which the reverberation is to be removed. The reverberation is removed from the sound data using the reverberation kernel.

In one or more implementations, a method is described of enhancing sound data through removal of noise from the sound data by one or more computing devices. The method includes generating a model using non-negative matrix factorization (NMF) that describes primary sound data, estimating additive noise and a reverberation kernel having parameters that, when applied to the model that describes the primary sound data, corresponds to the sound data from which the reverberation is to be removed, and removing the additive noise from the sound data based on the estimating and the reverberation from the sound data using the reverberation kernel.

In one or more implementations, a system is described of enhancing sound data through removal of reverberation from the sound data. The system includes a model generation module implemented at least partially in hardware to generate a model that describes primary sound data that is to be utilized as a prior that assumes no prior knowledge about specifics of the sound data from which the reverberation is to be removed. The system also includes a reverberation estimation module implemented at least partially in hardware to compute a reverberation kernel having parameters that, when applied to the model that describes the primary sound data, corresponds to the sound data from which the reverberation is to be removed. The system further includes a noise removal module implemented at least partially in hardware to remove the reverberation from the sound data using the reverberation kernel.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Inclusion of reverberation within a recording of sound is readily noticeable to users, such as reflections of sound involving a cathedral effect, and so on. Additionally, differences in reverberation are also readily noticeable to users, such as differences in reverberation as it occurs outside due to reflection off of trees and rocks as opposed to reflections involving furniture and walls within an indoor environment. Accordingly, inclusion of reverberation in sound may interfere with desired sounds (e.g., speech) within a recording, in an ability to splice recordings together, and so on. Conventional techniques involving dereverberation and thus removal of reverberation from a recording of sound, however, require use of speaker-dependent and/or environment dependent training data, which is typically not available in practical situations. As such, these conventional techniques typically fail in these situations.

Sound enhancement techniques through dereverberation are described. In one or more implementations, a model is pre-learned from clean primary sound data (e.g., speech) and thus does not include noise. The model is learned offline and may use sound data that is different from the sound data that is to be enhanced. In this way, the model does not assume prior knowledge about specifics of the sound data from which the reverberation is to be removed, e.g., particular speakers, an environment in which the sound data is captured, and so forth.

The model is then used to learn a reverberation kernel through comparison with sound data from which reverberation is to be removed. Thus, the reverberation kernel is learned through use of the model to approximate the sound data being processed. This technique may also be used to estimate additive noise included in the sound data. The reverberation kernel and the estimate of additive noise are then used to enhance the sound data through removal (e.g., reduction of part) of reverberation and the estimated additive noise. In this way, the sound data may be enhanced without use of prior knowledge about particular speakers or an environment and thus overcome limitations of conventional techniques. Further discussion of these and other examples are described in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
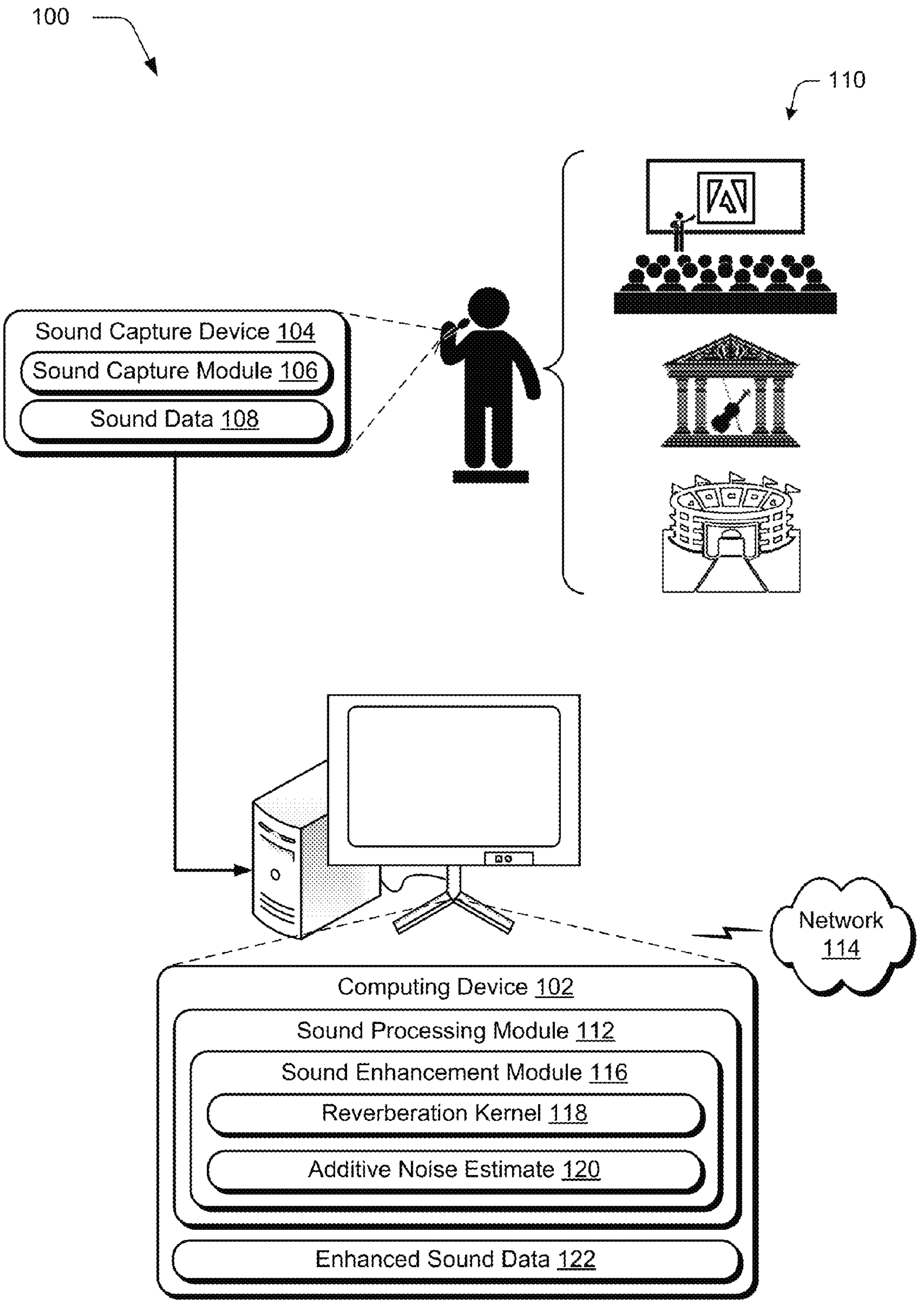
FIG. 1 is an illustration of an environment in an example implementation that is operable to employ techniques described herein.

FIG. 1 is an illustration of an environment 100 in an example implementation that is operable to employ dereverberation techniques described herein. The illustrated environment 100 includes a computing device 102 and a sound capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as further described in relation to FIG. 9.

The sound capture device 104 may also be configured in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture device 104 is illustrated separately from the computing device 102, the sound capture device 104 is configurable as part of the computing device 102, the sound capture device 104 may be representative of a plurality of sound capture devices, and so on.

The sound capture device 104 is illustrated as including a sound capture module 106 that is representative of functionality to generate sound data 108. The sound capture device 104, for instance, may generate the sound data 108 as a recording of an environment 110 surrounding the sound capture device 104 having one or more sound sources. This sound data 108 may then be obtained by the computing device 102 for processing.

The computing device 102 is also illustrated as including a sound processing module 112. The sound processing module 112 is representative of functionality to process the sound data 108. Although illustrated as part of the computing device 102, functionality represented by the sound processing module 112 may be further divided, such as to be performed "over the cloud" by one or more servers that are accessible via a network 114 connection, further discussion of which may be found in relation to FIG. 9.

An example of functionality of the sound processing module 112 is represented as a sound enhancement module 116. The sound enhancement module 116 is representative of functionality to enhance the sound data 108, such as through removal of reverberation through use of a reverberation kernel 118, removal of additive noise through use of an additive noise estimate 120, and so on to generate enhanced sound data 122.

The sound data 108, for instance, may be captured in a variety of different audio environments 110, illustrated examples of which include a presentation, concert hall, and stadium. Objects included in these different environments may introduce different amounts and types of reverberation due to reflection of sound off different objects included in the environments. Further, these different environments may also introduce different types and amounts of additive noise, such as a background noise, weather conditions, and so forth. The sound enhancement module 116 may therefore estimate the reverberation kernel 118 and the additive noise estimate 120 to remove the reverberation and the additive noise from the sound data 108 to generate enhanced sound data 122, further discussion of which is described in the following and shown in a corresponding figure.

Figure 2:
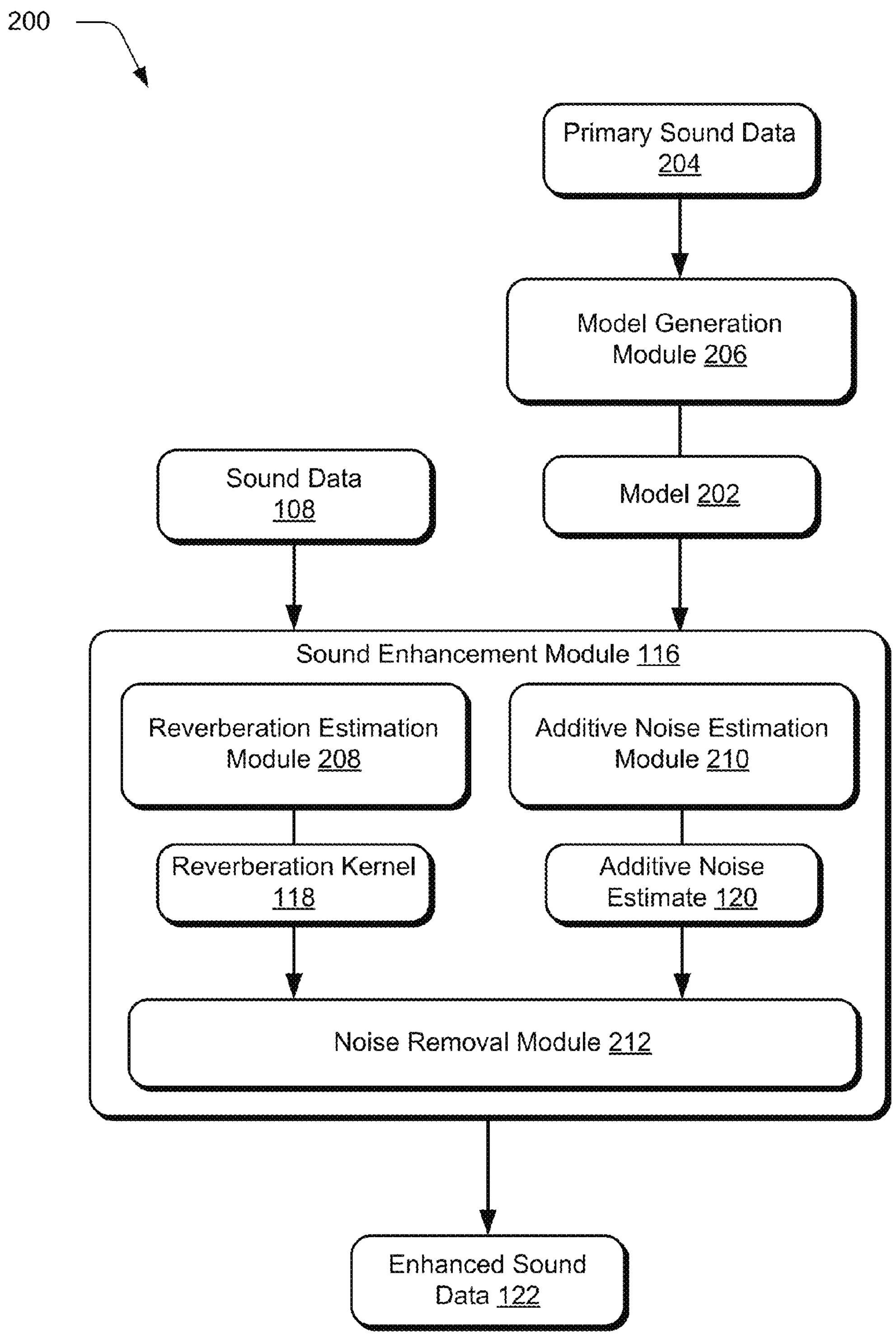
FIG. 2 depicts a system in an example implementation showing estimation of a reverberation kernel and additive noise estimate by a sound enhancement module of FIG. 1, which is shown in greater detail.
Figure 3:
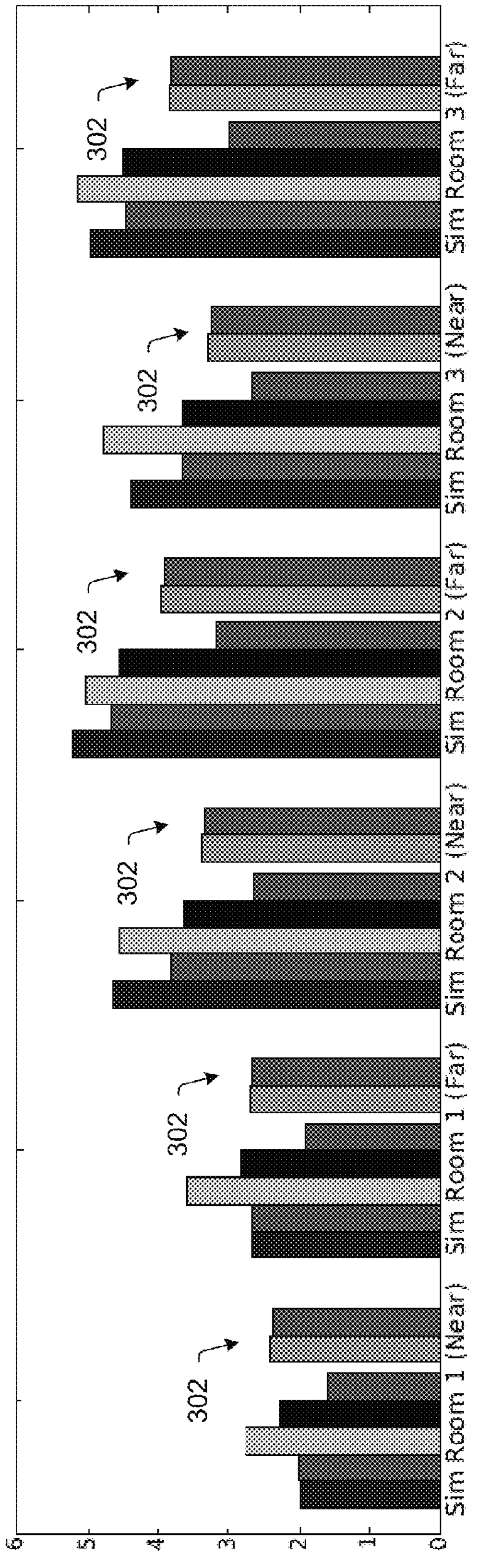
FIGS. 3-6 depict example speech enhancement results for cepstrum distance, Log-likelihood Ratio, Frequency weighted segmental SNR, and SRMR, respectively.
Figure 4:
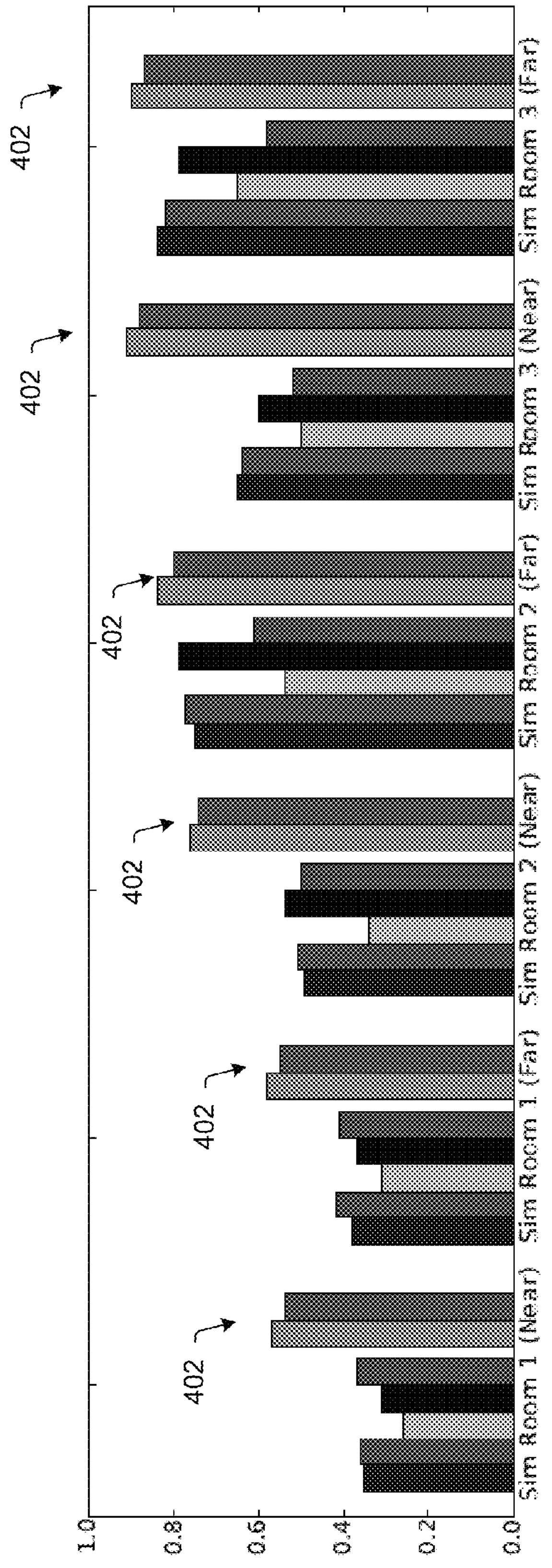
Figure 5:
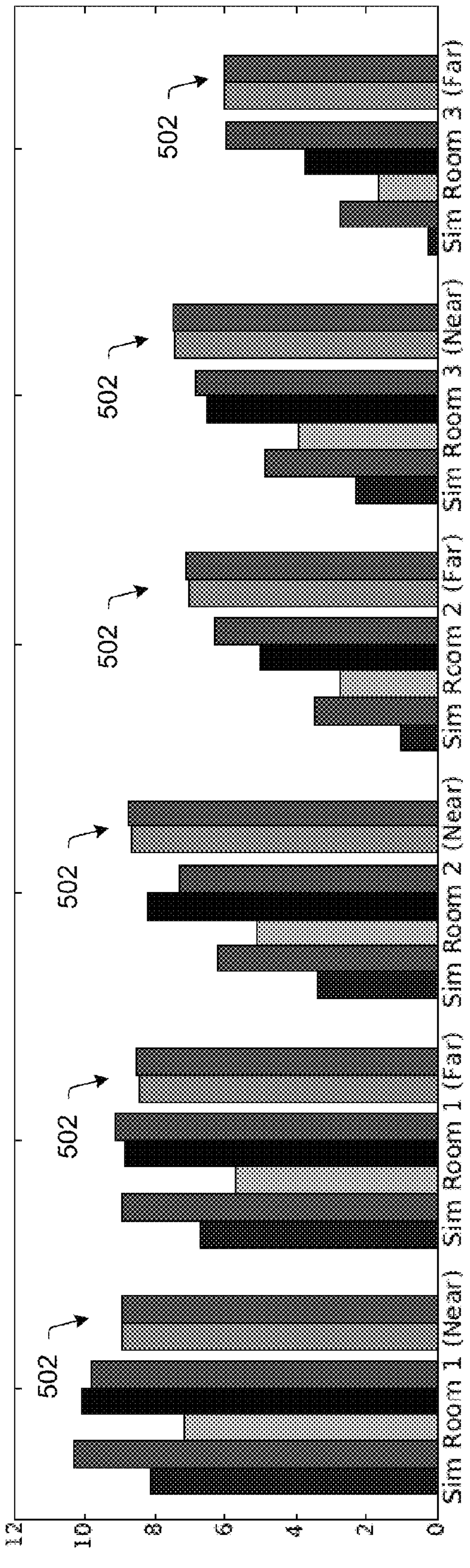
Figure 6:
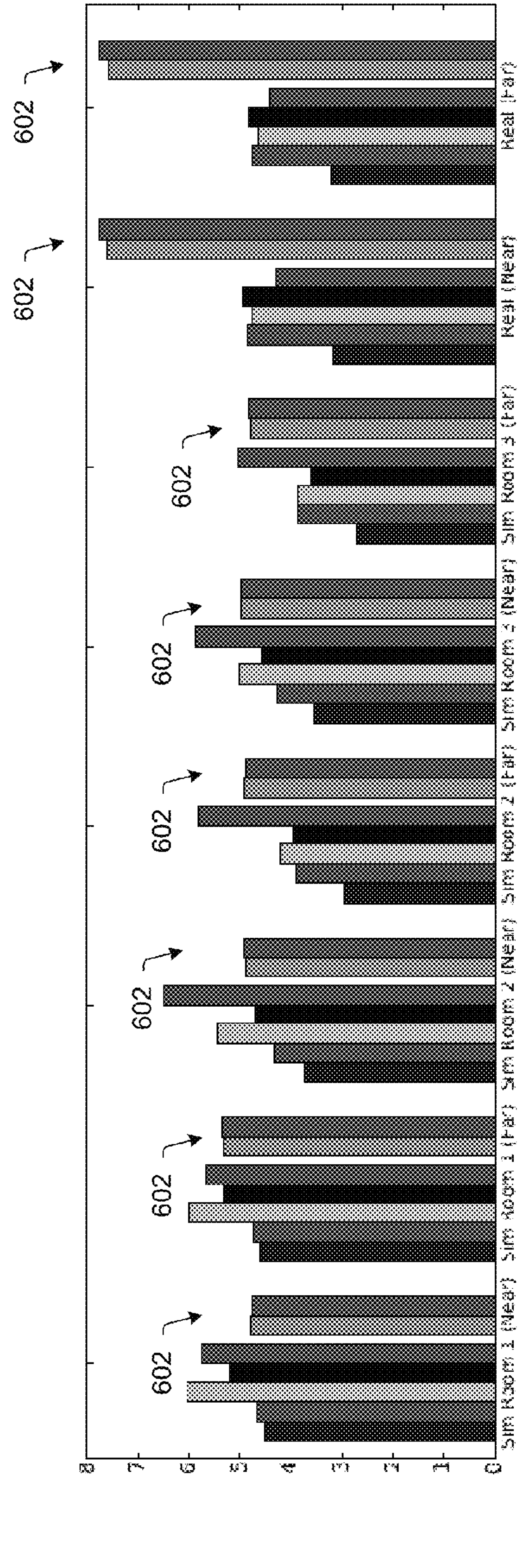

FIG. 2 depicts a system 200 in an example implementation showing estimation of the reverberation kernel 118 and the additive noise estimate 120 by the sound enhancement module 116, which is shown in greater detail. In the illustrated example, a model 202 is generated from primary sound data 204 by a model generation module 206. The sound data is primary in that it represents the sound data that is desired in a recording, such as speech, music, and so on and is thus differentiated from undesired sound data that may be included in a recording, which is also known as noise. Further, this generation may be performed offline and thus may be performed separately from processing performed by the sound enhancement module 116.

In this example, the primary sound data 204 is clean and thus includes minimal to no noise or other artifacts. In this way, the primary sound data 204 is an accurate representation of desired sound data and thus so too the model 202 provides an accurate representation of this sound data. The model generation module 206 may employ a variety of different techniques to generate the model 202, such as through probabilistic techniques including non-negative matrix factorization (NMF) as further described below, a product-of-filters model, and so forth.

As previously described, the model 202 is generated to act as a prior that does not assume prior knowledge of the sound data 108, e.g., speakers, environments, and so on. As such, the primary sound data 204 may have different speakers or other sources, captured in different environments, and so forth than the sound data 108 that is to be enhanced by the sound enhancement module 116.

The sound enhancement module 116 is illustrated as including a reverberation estimation module 204 and an additive noise estimation module 210. The reverberation estimation module 208 is representative of functionality to generate a reverberation kernel 118. For example, the reverberation estimation module 208 takes as an input the model 202 that describes primary and thus desired sound data and also takes as an input the sound data 108 that is to be enhanced. The reverberation estimation module 208 then estimates a reverberation kernel 118 in a manner such that a combination of the reverberation kernel 118 and the model 202 corresponds to (e.g., mimics, approximates) the sound data 108. Thus, the reverberation kernel 118 represents the reverberation in the sound data 108 and is therefore used by a noise removal module 212 to remove and/or lessen reverberation from the sound data 108 to generate the enhanced sound data 122.

Likewise, the additive noise estimation module 210 is configured to generate an additive noise estimate 120 of additive noise included in the sound data 108. For example, the additive noise estimation module 210 takes an inputs the model 202 that describes primary and thus desired sound data and the sound data 108 that is to be enhanced. The additive noise estimation module 210 then estimates an additive noise estimate 120 in a manner such that a combination of the additive noise estimate 120 and the model 202 corresponds (e.g., mimics, approximates) the sound data 108. Thus, the additive noise estimate 120 represents the additive noise in the sound data 108 and may therefore be used by a noise removal module 212 to remove and/or lessen an amount of additive noise in the sound data 108 to generate the enhanced sound data 122.

In this way, the sound enhancement module 116 dereverberates and removes other noise (e.g., additive noise) from the sound data 108 to produce enhanced sound data 122 without any prior knowledge of or assumptions about specific speakers or environments in which the sound data 108 is captured. In the following, a general single-channel speech dereverberation techniques is described based on an explicit generative model of reverberant and noisy speech.

To regularize the model, a pre-learned model 202 of clean primary sound data 204 is used as a prior to perform posterior inference over latent clean primary sound data 204, which is speech in the following but other examples are also contemplated. The reverberation kernel 118 and additive noise estimate 120 are estimated under a maximum-likelihood framework through use of a model 202 that treats the underlying clean speech as a set of latent variables. Thus, the model 202 is fit beforehand to a corpus of clean speech and is used as a prior to arrive at these variables, regularizing the model 202 and making it possible to solve an otherwise underdetermined dereverberation problem using a maximum-likelihood framework to compute the reverberation kernel 118 and the additive noise estimate 120.

In this way, the model 202 is capable of suppressing reverberation without any prior knowledge of or assumptions about the specific speakers or rooms and consequently can automatically adapt to various reverberant and noisy conditions. Example results in the following on both simulated and real data show that these techniques can work on speech or other primary sound data that is quite different than that used to train the model 202. Specifically, it is shown that a model of North American English speech can be very effective on British English speech.

Notational conventions are employed in the following discussion such that upper case bold letters (e.g. Y, X, and R) denote matrices and lower case bold letters (e.g., y, $\varkappa$, λ, and r) denote vectors. A value "f∈{1, 2, . . . , F}" is used to index frequency, a value "t∈{1, 2, . . . , T}" is used to index time, and a value "k∈{1, 2, . . . , K}" is used to index latent components in the pre-learned speech model 202, e.g., NMF model. The value "l∈{0, . . . , L−1}" is used to index lags in time.

Given magnitude spectra (also referred to simply as "spectra" in the following) of reverberant speech "$Y \in \mathbb{R}_+^{F\times T}$," the general dereverberation model is formulated as follows:

$$Y_{ft} \sim P(\Sigma_l X_{f,t-l} R_{fl} + \lambda_f) X_{ft} \sim S(\theta) \tag{1}$$

In the above expression, "P(·)" encodes the observational model and "S (·)" encodes the speech model. In the following, "P(·)" is a Poisson distribution, which corresponds to a generalized Kullback-Leibler divergence loss function.

The model parameter "$R \in \mathbb{R}_+^{F\times L}$" defines a reverberation kernel and "$\lambda \in \mathbb{R}_+^{F}$" defines the frequency-dependent additive noise, e.g., stationary background noise or other noise. The latent random variables "$X \in \mathbb{R}_+^{F\times T}$" represent the spectra of clean speech. The pre-learned speech model "S (·)," parametrized by "θ," acts as a prior that encourages "X" to resemble clean speech. The inference algorithm is used to uncover "X," and incidentally to estimate "R" and "λ" from the observed reverberant spectra "Y." An assumption may be made that the reverberant effect comes from a patch of spectra R instead of a single spectrum, and thus the model is capable of capturing reverberation effects that span multiple analysis windows.

A variety of different techniques may be used to form the model 202 by the model generation module 206. For example, non-negative matrix factorization (NMF) has been used in many speech-related applications, including denoising and bandwidth expansion. Here, a probabilistic version of NMF is used with exponential likelihoods, which corresponds to minimizing the Itakura-Saito divergence. Concretely, the model is formulated as follows:

$$Y_{ft} \sim \text{Poisson}(\Sigma_l X_{f,t-l} R_{fl} + \lambda_f)$$

$$X_{ft} \sim \text{Exponential}(c \Sigma_k W_{fk} H_{kt})$$

$$W_{fk} \sim \text{Gamma}(a,a), H_{kt} \sim \text{Gamma}(b,b) \tag{2}$$

In the above, "a" and "b" are model hyperparameters and "c" is a free scale parameter that is tuned to maximize a likelihood of "Y." The value "$X_{f,t-1}$" is a matrix, "$R_{fl}$" is reverb and "$\lambda_f$" is additive noise. For the latent components "$W \in \mathbb{R}_+^{F\times K}$," an assumption is made that the posterior distribution "$q(W|X_{clean})$" has been estimated from clean speech. Therefore, the posterior is computed over the clean speech "X" as well as the weights "$H \in \mathbb{R}_+^{K\times T}$" which are denoted as "p(X, H|Y)."

To estimate the reverberation kernel "R" and additive noise "λ," the likelihood of "p(Y|R, λ)" is maximized by marginalizing out latent random variables "X" and "H," which yields an instance of an expectation/maximization (EM) algorithm.

In the expectation step, the posterior "p(X, H|Y)" is computed using a current value of model parameters. However, this is intractable to compute due to the non-conjugacy of the model. Accordingly, this is approximated in this example via variational inference by choosing the following variational distribution:

$$q(X,H) = \Pi_t(\Pi_f q(X_{ft}))\Pi_k q(H_{kt})$$

$$q(X_{ft}) = \text{Gamma}(X_{ft}; \nu_{ft}^X, \rho_{ft}^X)$$

$$q(H_{kt}) = GIG(H_{kt}; \nu_{kt}^H, \rho_{kt}^H, \tau_{kt}^H) \tag{3}$$

GIG denotes the generalized inverse-Gaussian distribution, an exponential-family distribution with the following density:

$$GIG(x; \nu, \rho, \tau) = \frac{\exp\{(\nu-1)\log x - \rho x - \tau/x\}\rho^{\nu/2}}{2\tau^{\nu/2}K_\nu(2\sqrt{\rho\tau})} \tag{4}$$

for "$\varkappa \geq 0$, $\rho \geq 0$, and $\tau \geq 0 \cdot K_\nu(\cdot)$" denotes a modified Bessel function of the second kind. Using the GIG distribution for "$q(H_{kt})$" supports tuning of "q(H)" using closed-form updates.

The variational parameters "$\{\nu^X, \rho^X\}$" and "$\{\nu^H, \rho^H, \tau^H\}$" are tuned such that the Kullback-Leibler divergence between the variational distribution q(X,H) and the true posterior q(X, H|Y) is minimized. This is equivalent to maximizing the following variational objective, in which "$S^t \in \mathbb{R}_+^{F \times L}$ be a patch $X_{[t-L+1:t]}$)":

$$\sum_t (\mathbb{E}_q[\log p(y_t, S^t, h_t \mid \lambda, R)] - \mathbb{E}_q[\log q(x_t, h_t])) = \sum_{f,t} \mathbb{E}_q[\log p(Y_{ft} \mid s^t_f, \lambda_f, r_f)] + \sum_{f,t} \mathbb{E}_q\left[\log\frac{p(X_{ft} \mid w_f, h_t)}{q(X_{ft})}\right] + \sum_{k,t} \mathbb{E}_q\left[\log\frac{p(H_{kt} \mid b)}{q(H_{kt})}\right] \tag{5}$$

The expectations in the first and second terms cannot be computed analytically. However, the lower bounds may be computed on both of them. For the first term, Jensen's inequality is applied and auxiliary variables "$\phi_{ft}^\lambda \geq 0$ and $\phi_{ftl}^R \geq 0$" are introduced where "$\phi_{ft}^\lambda + \Sigma_l \phi_{ftl}^R = 1$." For the second term, auxiliary variables "$\phi_{ftk}^X \geq 0$ where $\Sigma_k \phi_{ftk}^X = 1$ and $\omega_{ft} < 0$" are introduced to determine the bound. The lower bound of the variational objective in Equation 5 is computed as follows:

$$\begin{aligned}\mathcal{L} \triangleq \sum_{f,t} \Big\{ & Y_{ft}\big(\phi_{ft}^\lambda(\log\lambda_f - \log\phi_{ft}^\lambda) + \sum_l \phi_{ftl}^R(\mathbb{E}_q[\log X_{f,t-l}] + \log R_{fl} - \log\phi_{ftl}^R)\big) - \lambda_f - \sum_l \mathbb{E}_q[X_{f,t-l}]R_{fl}\Big\} + \\ \sum_{f,t} \Big\{ & \Big(\rho_{ft}^X - \sum_k \frac{(\phi_{ftk}^X)^2}{c}\mathbb{E}_q\Big[\frac{1}{W_{fk}H_{kt}}\Big]\Big)\mathbb{E}_q[X_{ft}] - \log(c\omega_{ft}) + (1-\nu_{ft}^X)\mathbb{E}_q[\log X_{ft}] + A^\Gamma(\nu_{ft}^X, \rho_{ft}^X) - \frac{1}{\omega_{ft}}\sum_k \mathbb{E}_q[W_{fk}H_{kt}]\Big\} + \\ \sum_{k,t} \Big\{ & (b-\nu_{kt}^H)\mathbb{E}_q[\log H_{kt}] - (b-\rho_{kt}^H)\mathbb{E}_q[H_{kt}] - \tau_{kt}^H\mathbb{E}_q\Big[\frac{1}{H_{kt}}\Big] + A^{GIG}(\nu_{kt}^H, \rho_{kt}^H, \tau_{kt}^H)\Big\} + const\end{aligned} \tag{6}$$

where "$A^\Gamma(\cdot)$" and "$A^{GIG}(\cdot)$" denote the log-partition functions for gamma and GIG distributions, respectively. Optimizing over "$\phi$'s" with Lagrangian multipliers, the bound for the first term in Equation 5 is tightest when:

$$\phi_{ft}^\lambda = \frac{\lambda_f}{\lambda_f + \sum_j \exp\{\mathbb{E}_q[\log X_{f,t-j}]\}R_{fj}}; \tag{7}$$

-continued $$\phi_{ftl}^R = \frac{\exp\{\mathbb{E}_q[\log X_{f,t-l}]\}R_{fl}}{\lambda_f + \sum_j \exp\{\mathbb{E}_q[\log X_{f,t-j}]\}R_{fj}}.$$

Similarly, an optimization may be performed over "$\phi_{ftk}^X$" and "$\omega_{ft}$" and tighten the bound on the second term as follows:

$$\phi_{ftk}^X \propto \left(\mathbb{E}_q\left[\frac{1}{W_{fk}H_{kt}}\right]\right)^{-1}; \; \omega_{ft} = \sum_k \mathbb{E}_q[W_{fk}H_{kt}] \tag{8}$$

Given the lower bound in Equation 6, "$\mathcal{L}$" is maximized using coordinate ascent, iteratively optimizing each variational parameter while holding each of the other parameters fixed. To update "$\{\nu_t^X, \rho_t^X\}$" by taking the derivative of "$\mathcal{L}$" and setting it to 0, the following is utilized:

$$\nu_{ft}^X = 1 + \sum_l Y_{f,t+l}\phi_{f,t+l,l}^R; \quad \rho_{ft}^X = \frac{1}{c}\cdot\left(\sum_k \mathbb{E}_q\left[\frac{1}{W_{fk}H_{kt}}\right]^{-1}\right)^{-1} + \sum_l R_{fl}. \tag{9}$$

Similarly, the derivative of "$\mathcal{L}$" with respect to "$\{\nu_t^H, \rho_t^H, \tau_t^H\}$" equals zero and "$\mathcal{L}$" is maximized when:

$$\nu_{kt}^H = b; \; \rho_{kt}^H = b + \sum_f \frac{\mathbb{E}_q[W_{fk}]}{\omega_{ft}}; \quad \tau_{kt}^H = \sum_f \frac{\mathbb{E}_q[W_{ft}]}{c}(\phi_{ftk}^X)^2\mathbb{E}_q\left[\frac{1}{W_{fk}}\right]. \tag{10}$$

Each time the value of variational parameters changes, the scale "c" is updated accordingly:

$$c = \frac{1}{FT}\sum_{f,t}\mathbb{E}_q[X_{ft}]\left(\sum_k \mathbb{E}_q\left[\frac{1}{W_{fk}H_{kt}}\right]^{-1}\right)^{-1} \tag{11}$$

Finally, the expectations are as follows, in which $\psi(\cdot)$ is the digamma function:

$$\mathbb{E}_q[X_{ft}] = \frac{\nu_{ft}^X}{\rho_{ft}^X}; \; \mathbb{E}_q[\log X_{ft}] = \psi(\nu_{ft}^X) - \log\rho_{ft}^X; \quad \mathbb{E}_q[H_{kt}] = \frac{\mathcal{K}_{\nu+1}(2\sqrt{\rho\tau})\sqrt{\tau}}{\mathcal{K}_\nu(2\sqrt{\rho\tau})\sqrt{\rho}}; \quad \mathbb{E}_q\left[\frac{1}{H_{kt}}\right] = \frac{\mathcal{K}_{\nu-1}(2\sqrt{\rho\tau})\sqrt{\rho}}{\mathcal{K}_\nu(2\sqrt{\rho\tau})\sqrt{\tau}}. \tag{12}$$

In the maximization step, given the approximated posterior estimated from the expectation step, the derivative of "$\mathcal{L}$" is taken with respect to "λ" and "R" and the following updates are obtained:

$$\lambda_f = \frac{1}{T}\sum_t \phi^{\lambda}_{ft} Y_{ft};\ R_{fl} = \frac{\sum_t \phi^{R}_{ftl} Y_{ft}}{\sum_t \mathbb{E}_q[X_{ft}]} \tag{13}$$

The overall variational EM algorithm alternates between two steps. In the expectation step, the speech model attempts to explain the observed spectra as a mixture of clean speech, reverberation, and noise. In particular, it updates its beliefs about the latent clean speech via updating the variational distribution "q(X)." In the maximization step, the model updates its estimate of the reverberation kernel and additive noise given its current beliefs about the clean speech.

A speech model that is considered "good" assigns high probability to clean speech and lower probability to speech corrupted with reverberation and additive noise. The full model therefore has an incentive to explain reverberation and noises using the reverberation kernel and additive noise parameters, rather than considering them part of the clean speech. In other words, the model tries to "explain away" reverberation and noise and leave behind corresponding spectra.

By iteratively performing the expectation and maximization steps, a stationary point of the objective "$\mathcal{L}$" is reached. To obtain the dereverbed spectra, the expectation of "X" is taken under the variational distribution. To recover time-domain signals, Wiener filter based approach is taken on the estimated dereverbed spectra "$\mathbb{E}_q[X]$." In practice, however, it has been noticed that the Wiener filter aggressively takes energy from the complex spectra due to the crudeness of the estimated dereverbed spectra and produces artifacts. Accordingly, in one or more implementations a simple heuristic is applied to smooth "$\mathbb{E}_q[X]$" by convolving it with an attenuated reverberation kernel "R*," where "$R^*_{f,0}=R_{f,0}$ and $R^*_{f,l}=\alpha R_{fl}$ for $l \in \{1, \ldots, L-1\}$. $\alpha \in (0,1)$" controls the attenuation level to attenuate a tail of the reverberation, which may be used to smooth over artifacts to sound natural.

The speech model "$\mathcal{S}(\cdot)$" may take a variety of other forms, such as a Product-of-Filters (PoF) model. The PoF model uses a homomorphic filtering approach to audio and speech signal processing and attempts to decompose the log-spectra into a sparse and non-negative linear combination of "filters", which are learned from data. Incorporating the PoF model into the framework defined in Equation 1 is straightforward:

$$Y_{ft} \sim \text{Poisson}(\Sigma_l X_{f,t-l} R_{ft} + \lambda_f)$$

$$X_{ft} \sim \text{Gamma}(\gamma_f, \gamma_f \Pi_k \exp\{-U_{fk} H_{kt}\})$$

$$H_{kt} \sim \text{Gamma}(\alpha_k, \alpha_k) \tag{14}$$

where the filters "$U \in \mathbb{R}^{F \times K}$," sparsity level "$\alpha \in \mathbb{R}_+^{K}$," and frequency-dependent noise-level "$\gamma \in \mathbb{R}_+^{F}$" are the PoF parameters learned from clean speech. The expression "$H \in \mathbb{R}_+^{K \times T}$" denotes the weights of linear combination of filters. The inference can be carried out in a similar way as described above. In one or more implementations, an assumption of independence between frames of sound data is relaxed by imposing temporal structure to the speech model, e.g. with a nonnegative hidden Markov model or a recurrent neural network.

EXAMPLE RESULTS

In the following, example sound data 108 is obtained from two sources. One is simulated reverberant and noisy speech, which is generated by convolving clean utterances with measured room impulse responses and then adding measured background noise signals. The other is a real recording in a meeting room environment.

For simulated data, three rooms with increasing reverberation lengths (e.g., $T_{60}$'s of the three rooms are 0.25 s, 0.5 s, 0.7 s, respectively) are used. For each room, two microphone positions (near and far) are adopted, which in total provides six different evaluation conditions. In the real recording, the meeting room has a measured $T_{60}$ of 0.7 s.

Speech enhancement techniques may be evaluated by several metrics, including cepstrum distance (CD), log-likelihood ratio (LLR), frequency-weighted segmental SNR (FWSegSNR), and speech-to-reverberation modulation energy ratio (SRMR). For real recordings, the non-intrusive SRMR is used.

Since the techniques described herein may process each utterance separately without relying on any particular test condition, these techniques are compared with other utterance-based approaches. Two exponential NMF speech models with K=50 are used as the priors used in the dereverberation algorithm, one is from the clean training corpus of British English and the other is from a corpus of American English. In the STFT, a 1024-sample window is used with 512-sample overlap. Model hyper-parameters "α=b=0.1," reverberation kernel length "L=20" (i.e., 640 ms), and attenuation level "α=0.1" are used.

The speech enhancement results are summarized in FIGS. 3-6 for cepstrum distance (lower is better), Log-likelihood Ratio (lower is better), Frequency weighted segmental SNR (higher is better), and SRMR (higher is better), respectively. The results are grouped by different test conditions, with results 302, 402, 502, 602 of the techniques described herein positioned as the last two bars for each instance. As illustrated, on the techniques described herein improve each of the metrics except LLR over the unprocessed speech by a large margin.

At first glance, the results 302, 402, 502, 602 do not stand out when the reverberant effect is relatively small, e.g., Room 1. However, as "$T_{60}$" increases, results improve regardless of microphone position.

It is also noted that the techniques described herein perform equally well when using a speech model trained on American English speech and tested on British English speech. That is, the performance is competitive with the state of the art even when training data is not utilized. This robustness to training-set-test-set mismatch allows the techniques described herein to be used in real-world applications where little to no prior knowledge about the specific people who are speaking or the room that is coloring their speech is available. The ability to do without speaker/room-specific clean training data may also explain the superior performance of the techniques on the real recording.

In the above, a general single-channel speech dereverberation model is described, which follows the generative process of the reverberant and noisy speech. A speech model, learned from clean speech, is used as a prior to properly regularize the model. NMF is adapted as a particular speech model into the general algorithm and used to derive an efficient closed-form variational EM algorithm to perform posterior inference and to estimate reverberation and noise parameters. These techniques may also be extended, such as to incorporate a temporal structure, utilize Stochastic variational inference to perform real-time/online dereverberation, and so on. Further discussion of these and other techniques is described in relation to the following procedures and is shown in a corresponding figures.

Example Procedures

The following discussion describes dereverberation and additive noise removal techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
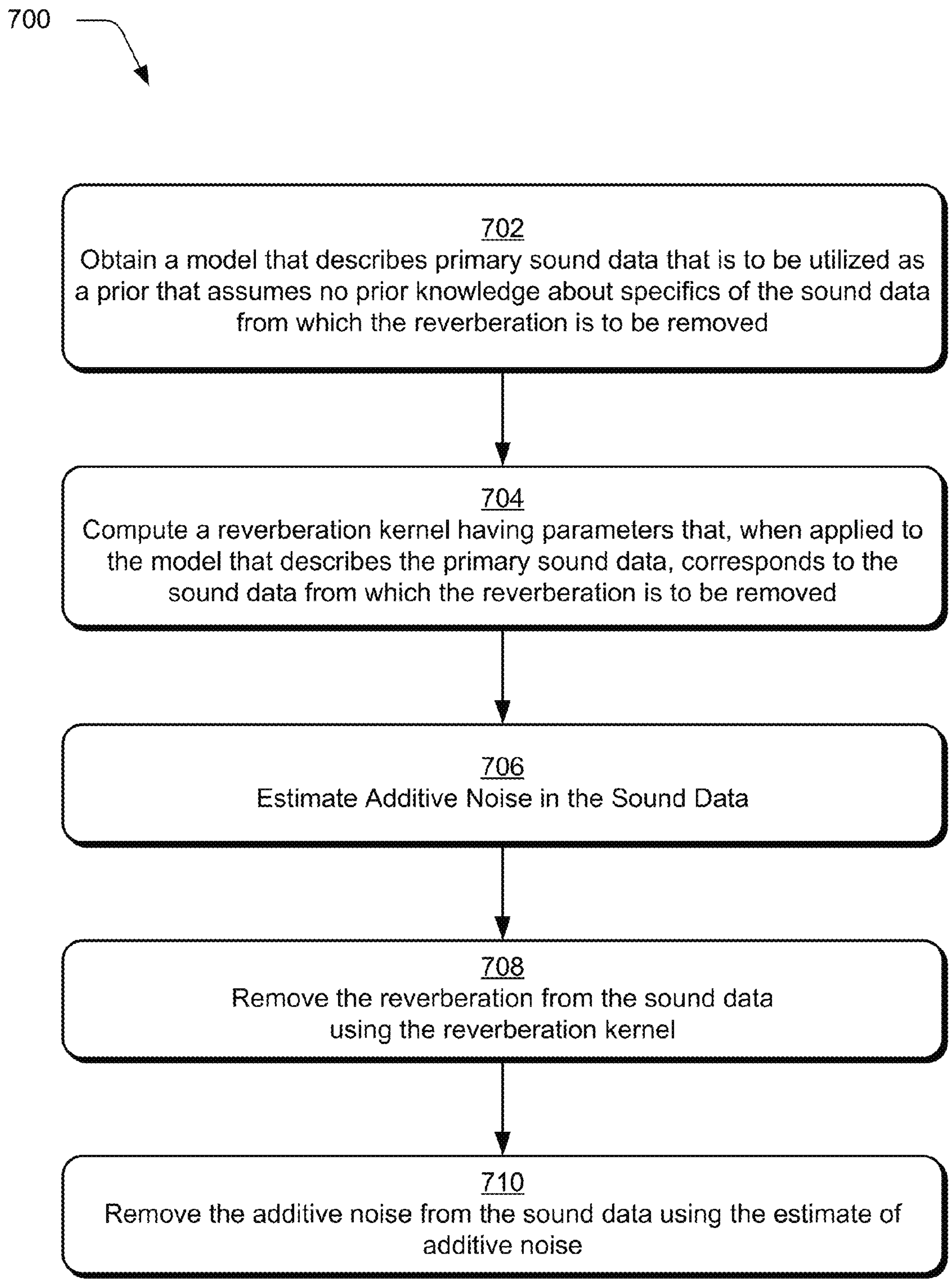
FIG. 7 is a flow diagram depicting a procedure in an example implementation in which sound data is enhanced through removal of reverberation from the sound data by one or more computing devices.

FIG. 7 depicts a procedure 700 in an example implementation in which a technique is described of enhancing sound data through removal of reverberation from the sound data by one or more computing devices. The technique includes obtaining a model that describes primary sound data that is to be utilized as a prior that assumes no prior knowledge about specifics of the sound data from which the reverberation is to be removed (block 702). The model 202, for instance, may be computed offline using primary sound data 204 that is different than the sound data 108 to be processed for removal of reverberation.

A reverberation kernel is computed having parameters that, when applied to the model that describes the primary sound data, corresponds to the sound data from which the reverberation is to be removed (block 704). Likewise, additive noise is estimated having parameters that, when applied to the model that describes the primary sound data, corresponds to the sound data from which the additive noise is to be removed (block 706). Continuing with the previous example, the reverberation kernel 118 is estimated such that a combination of the reverberation kernel 118 and the model 202 approximates the sound data to be processed. Similar techniques are used by the additive noise estimation module 210 to arrive at the additive noise estimate 120.

The reverberation is removed from the sound data using the reverberation kernel (block 708) and the additive noise is removed using the estimate of additive noise (block 710). In this way, enhanced sound data 122 is generated without use of prior knowledge as is required using conventional techniques.

Figure 8:
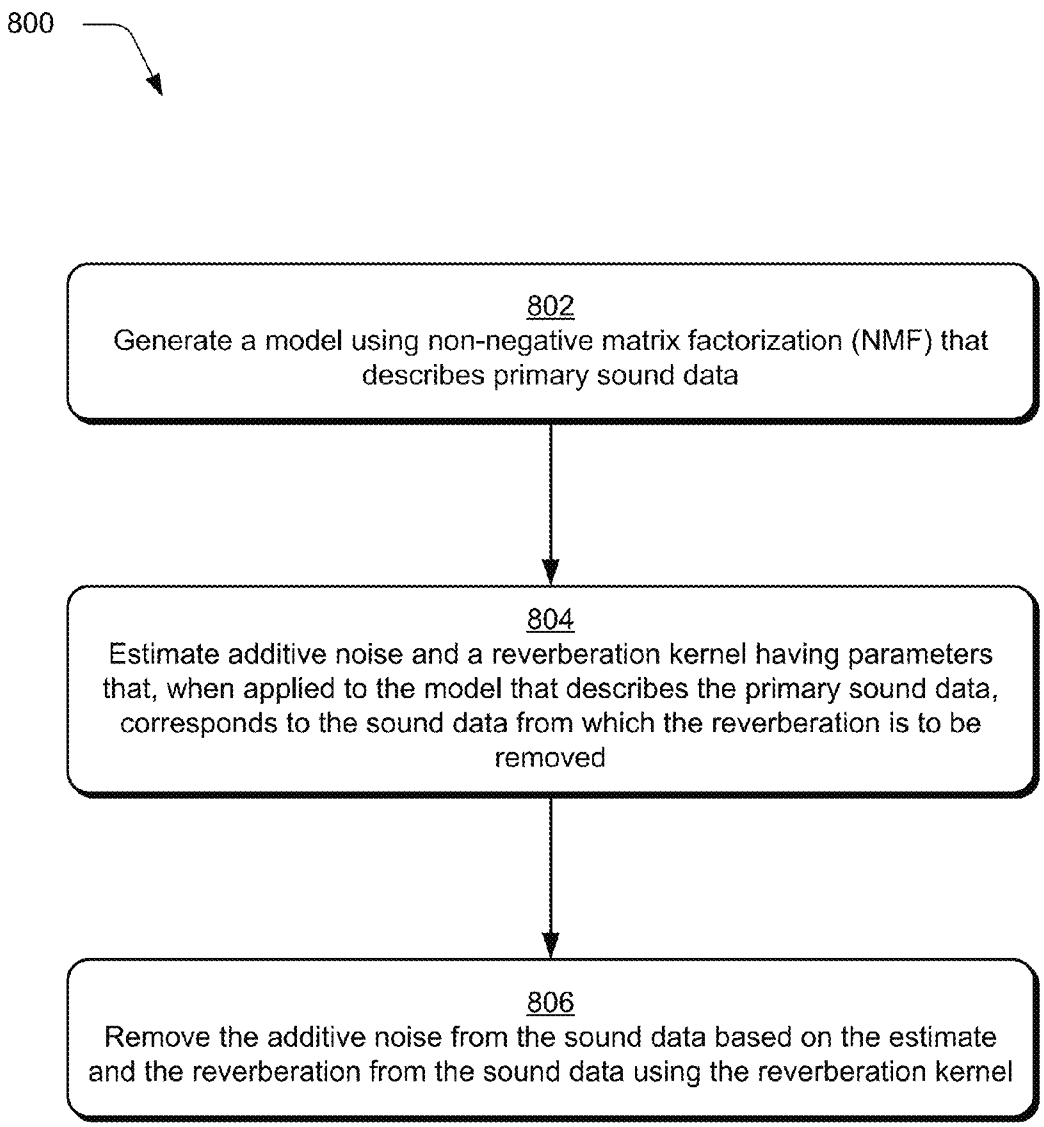
FIG. 8 is a flow diagram depicting a procedure configured to enhance sound data through removal of noise from the sound data by one or more computing devices.

FIG. 8 depicts a procedure 800 configured to enhance sound data through removal of noise from the sound data by one or more computing devices. The method includes generating a model using non-negative matrix factorization (NMF) that describes primary sound data (block 802). The model generation module 206, for instance, generates the model 202 from primary sound data 204 using NMF.

Additive noise and a reverberation kernel are estimated having parameters that, when applied to the model that describes the primary sound data, corresponds to the sound data from which the reverberation is to be removed (block 804). As before, the model 202 is used by the sound enhancement module 116 to estimate a reverberation kernel 118 and an additive noise estimate 120, e.g., background or other noise. The additive noise is then removed from the sound data based on the estimate and the reverberation is removed from the sound data using the reverberation kernel (block 806). A variety of other examples are also contemplated, such as to configure the model 202 as a product-of-filters.

Example System and Device

Figure 9:
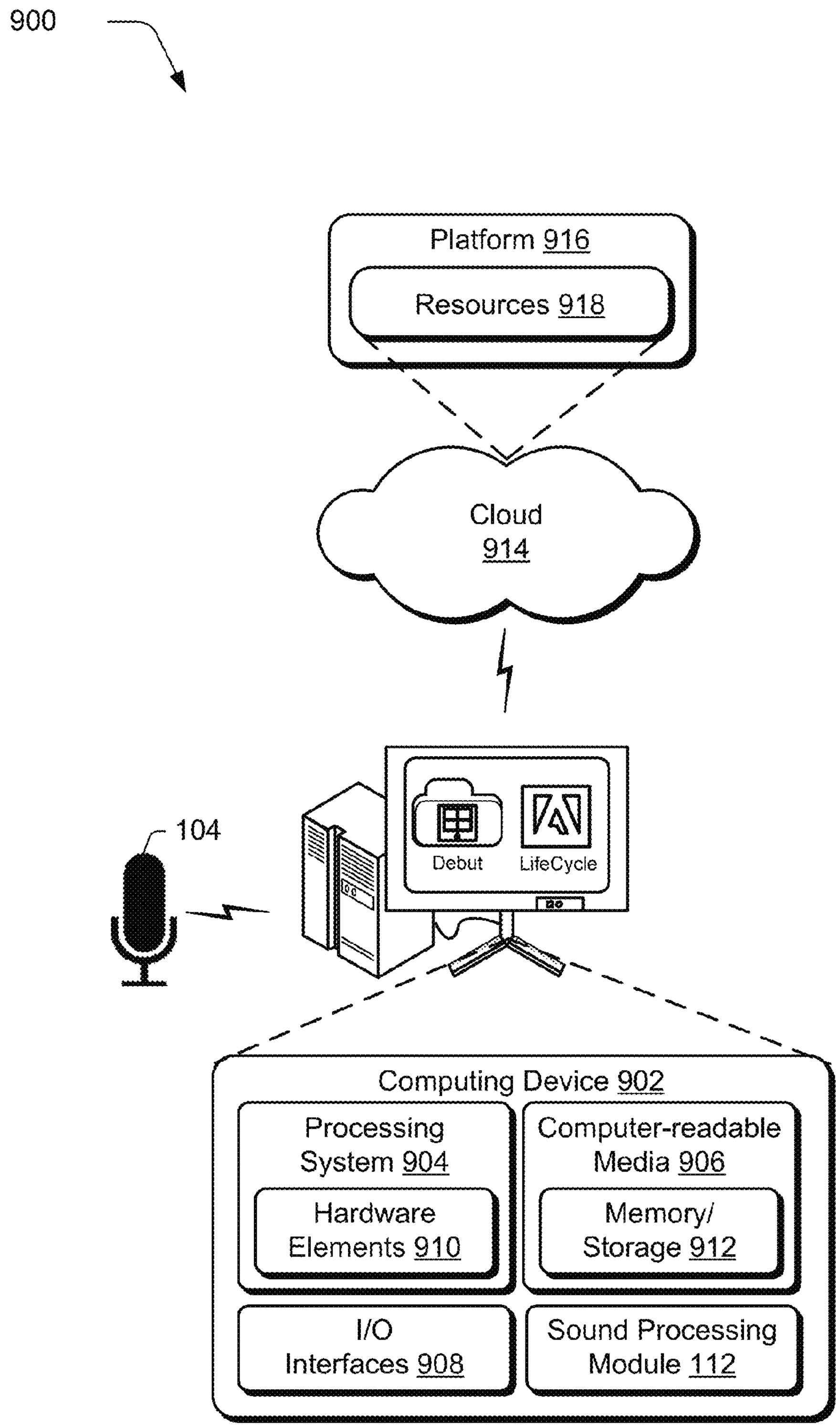
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the sound processing module 112 and sound capture device 104. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of enhancing sound data through removal of reverberation from the sound data by at least one computing devices, the method comprising:

obtaining, by the at least one computing device, a model that describes primary sound data that is to be utilized as a prior that assumes no prior knowledge about specifics of the sound data, captured by a sound capture device, from which the reverberation is to be removed;

computing, by the at least one computing device, a reverberation kernel based on the primary sound data and the sound data, the reverberation kernel having parameters that, when applied to the model that describes the primary sound data, corresponds to the sound data from which the reverberation is to be removed;

removing, by the at least one computing device, the reverberation from the sound data using the computed reverberation kernel; and outputting, by the at least one computing device, the sound data having the removed reverberation.

2. A method as described in claim 1, wherein the specifics are particular speakers or characteristics of a particular environment, in which, the sound data is captured.

3. A method as described in claim 1, wherein the primary sound data is speech data that is generally clean and therefore generally free of noise.

4. A method as described in claim 1, wherein the model is expressed as a set of latent variables of a probabilistic model.

5. A method as described in claim 4, wherein the set of latent variables define a non-negative matrix factorization (NMF) model.

6. A method as described in claim 1, wherein the computing of the reverberation kernel is performed using an expectation maximization (EM) algorithm to perform posterior inference.

7. A method as described in claim 1, wherein the model is expressed as a product-of-filters model.

8. A method as described in claim 1, further comprising:

estimating additive noise in the sound data as part of the computing of the reverberation kernel; and removing additive noise based on the estimated additive noise from the sound data as part of the removing of the reverberation.

9. A method as described in claim 8, wherein the computing of the reverberation kernel and the estimating of the additive noise are performed under a maximum-likelihood framework.

10. A method as described in claim 1, wherein the computing includes attenuating a tail of the reverberation kernel.

11. A method of enhancing sound data through removal of noise from the sound data by at least one computing devices, the method comprising:

generating, by the at least one computing device, a model using non-negative matrix factorization (NMF) that describes primary sound data;

estimating, by the at least one computing device, additive noise and a reverberation kernel having parameters that, when applied to the model that describes the primary sound data, corresponds to the sound data from which reverberation is to be removed, the estimating based on the primary sound data and the sound data and the sound data captured by a sound capture device;

removing, by the at least one computing device, additive noise from the sound data based on the estimated additive noise and removing the reverberation from the sound data using the estimated reverberation kernel; and outputting, by the at least one computing device, the sound data having the additive noise and the reverberation removed.

12. A method as described in claim 11, wherein the model is to be utilized as a prior that assumes no prior knowledge about specifics of the sound data from which the reverberation is to be removed.

13. A method as described in claim 12, wherein the specifics are particular speakers or characteristics of a particular environment, in which, the sound data is captured.

14. A method as described in claim 11, wherein the estimating of the reverberation kernel is performed using an expectation maximization (EM) algorithm to perform posterior inference.

15. A method as described in claim 11, wherein the estimating of the reverberation kernel and the estimating of the additive noise are performed under a maximum-likelihood framework.

16. A system of enhancing sound data through removal of reverberation from the sound data, the system comprising:

a model generation module implemented at least partially in hardware to generate a model that describes primary sound data that is to be utilized as a prior that assumes no prior knowledge about specifics of the sound data from which the reverberation is to be removed that is captured by a sound capture device;

a reverberation estimation module implemented at least partially in hardware to estimate a reverberation kernel having parameters based on the primary sound data and the sound data that, when applied to the model that describes the primary sound data, corresponds to the sound data from which the reverberation is to be removed; and a noise removal module implemented at least partially in hardware to remove the reverberation from the sound data using the estimated reverberation kernel.

17. A system as described in claim 16, wherein the specifics are particular speakers or characteristics of a particular environment, in which, the sound data is captured.

18. A system as described in claim 16, wherein the model is expressed as a set of latent variables of a non-negative matrix factorization (NMF) model or a product-of-filters model.

19. A system as described in claim 16, wherein the computing of the reverberation kernel is performed using an expectation maximization (EM) algorithm to perform posterior inference.

20. A system as described in claim 16, further comprising an additive noise estimation module to estimate additive noise in the sound data as part of the computing of the reverberation kernel and remove additive noise from the sound data based on the estimated additive noise as part of the removal of the reverberation.

* * * * *